US00RE42182E

(19) United States
(12) Reissued Patent
Yu

(10) Patent Number: US RE42,182 E
(45) Date of Reissued Patent: Mar. 1, 2011

(54) BACK-LIGHT CONTROL CIRCUIT OF MULTI-LAMPS LIQUID CRYSTAL DISPLAY

(75) Inventor: Chung-Che Yu, Taipei (TW)

(73) Assignee: Beyond Innovation Technology Co., Ltd., Taipei (TW)

(21) Appl. No.: 11/174,421

(22) Filed: Jul. 1, 2005

Related U.S. Patent Documents

Reissue of:
(64) Patent No.: 6,750,842
Issued: Jun. 15, 2004
Appl. No.: 10/128,240
Filed: Apr. 24, 2002

(51) Int. Cl.
*G09G 3/36* (2006.01)

(52) U.S. Cl. ..... 345/102; 345/87; 345/211; 345/212; 345/213; 345/100; 345/61; 345/88; 345/89; 345/98; 315/209 R; 315/291; 315/100

(58) Field of Classification Search ..... 345/89, 345/102, 211–213
See application file for complete search history.

(56) References Cited

U.S. PATENT DOCUMENTS 6,088,249 A * 7/2000 Adamson ..... 363/97
6,385,067 B2 * 5/2002 Galbiati et al. ..... 363/132
6,396,722 B2 * 5/2002 Lin ..... 363/98
7,084,583 B2 * 8/2006 Hur et al. ..... 315/291
2002/0003525 A1 * 1/2002 Hwang

* cited by examiner

*Primary Examiner*—Kevin M Nguyen
(74) *Attorney, Agent, or Firm*—Jianq Chyun IP Office

(57) ABSTRACT

A multi-lamps LCD back-light control circuit comprises a control unit, an full bridge switch, a resonance network circuit, a voltage transformer, a lamp, and a feedback network. A constant operating frequency and a pulse width modulation (PWM) feedback are used to control the CCFL current. The back-light control circuit is such that a power switch of the full bridge switch outputs a duty cycle that is controlled and changed via a PWM controller of the control unit, while a ground switch of the full bridge switch outputs a constant duty cycle controllable above 50%.

20 Claims, 10 Drawing Sheets

BACK-LIGHT CONTROL CIRCUIT OF MULTI-LAMPS LIQUID CRYSTAL DISPLAY

Matter enclosed in heavy brackets [ ] appears in the original patent but forms no part of this reissue specification; matter printed in italics indicates the additions made by reissue.

FIELD OF THE INVENTION

The invention relates to a multi-lamps LCD back-light control circuit. More particularly, the invention provides a control circuit that can simplify the circuitry of dimensionally larger LCD devices.

BACKGROUND OF THE INVENTION

Compared to traditional white thermal lamps, cold cathode fluorescent lamps (CCFL) have many advantages such as higher efficiency and longer service life. Therefore, an important number of liquid crystal display (LCD) presently uses CCFL as light source. To achieve a stable operation of the CCFL, the power frequency needed is about 30 KHz through 80 KHz without the stringed wave from the DC current part while the operating voltage is approximately constant. The illumination of the lamp is determined according to the tube current there through. The voltage needed to turn on the lamp is higher than the normal stable operating voltage 2 to 2.5 times. The turn on voltage and operating voltage of the CCFL are determined from the size of the CCFL. Traditional 14", 15" LCD screens incorporate CCFL that require a turn-on voltage of about 1400 Vrms, and an operating voltage of about 650 Vrms at the highest normal current of 7 mA. To regulate the CCFL, a common control method is the use of an electrical stabilizer such as a typical fixed frequency operation full bridge phase shift converter that can convert direct current to alternating current.

As shown in FIG. 1, a typical fixed frequency operation full bridge phase shift converter comprises a resonance inductor 105, a capacitor 106 circuit, a lamp 107, NMOS switches 101, 102, 103, 104, and DC current 108. The turn-on or turn-off of NMOS switches 101, 102, 103, 104 are respectively controlled via the gale voltages VG1, VG2, VG3, VG4. Typical control signals are four similar constant frequencies with a same duty cycle slightly smaller than 50% and different square waves. A typical fixed frequency operation full bridge phase shift converter moves the phase of the control voltage so as to use different sizes of phase retardations to generate different output powers. FIG. 2A and FIG. 2B schematically illustrate the operation time/sequence of a typical fixed frequency operation full bridge phase shift converter. To prevent the NMOS switches 101, 102 (and 103, 104), directly connected to each other, to be simultaneously turned off, which causes a power loss, the control signals VG1, VG2 (and VG3, VG4) must maintain a phase retardation of 180°. The phase retardation of VG1, VG3 in FIG. 2A is smaller than that of FIG. 2B, which generates a higher duty cycle VAB and more power outputs.

However, the present use of traditional fixed frequency operation full bridge phase shift converter in LCD screens presents several problems. Within present LCD devices, the DC voltage provided by the circuit is only about 10 to 20 volts. The electrical stabilizer of the CCFL of FIG. 1 needs a direct voltage of hundreds of volts to operate. Moreover, this stabilizer uses a NMOS as power switch. As a result, when it is driven, the voltage VG1 (respectively VG2) at the point A (respectively B) must be cautiously increased. Additional step-up circuits thus must be included within the driving circuits of the NMOSFET power switches 101, 104.

SUMMARY OF THE INVENTION

It is therefore a first object of the invention to provide a CCFL control circuit that is adapted to a dimensional increase of the LCD devices.

It is a second object of the invention to provide a CCFL control circuit that incorporates a step-up voltage transformer so that the number of high-voltage resistant elements can be reduced within the control circuit.

Furthermore, it is third object of the invention to provide a CCFL control circuit that incorporates PMOSFET as power switches so that additional step-up circuits are not needed to directly drive the switches.

Still, it is a fourth object of the invention to provide a CCFL control circuit in which the cycle of ground switches is fixed so as to change the cycle of the power switches, thereby the voltage conversion is more efficient.

Furthermore, it is a fifth object of the invention to provide a CCFL control circuit in which the cycle of ground switches is fixed so as to change the cycle of the power switches, thereby most of the circuit current flows through the ground switches. Loss increase due to higher resistivity of PMOSFET power switches is therefore favorably reduced.

Still, it is a sixth object of the invention to provide a CCFL control circuit in which stabilization of the lamp current is achieved via pulse width modulation (PWM) feedback control.

Yet, it is a seventh object of the invention to provide a CCFL control circuit in which constant frequency and frequency synchronization are implemented to reduce frequency retardation interference within the multi-lamp circuit, caused by the use of different driving circuits.

Furthermore, it is an eighth object of the invention to provide a CCFL control circuit in which constant frequency and phase synchronization are implemented to reduce phase retardation interference within the multi-lamp circuit, caused by the use of different driving circuits.

Still, it is a ninth object of the invention to provide a CCFL control circuit in which the principal control elements can be fabricated on a same integrated circuit.

To provide a further understanding of the invention, the following detailed description illustrates embodiments and examples of the invention, this detailed description being provided only for illustration of the invention.

BRIEF DESCRIPTION OF THE DRAWINGS

The drawings included herein provide a further understanding of the invention. A brief introduction of the drawings is as follows.

DETAILED DESCRIPTION OF THE EMBODIMENTS

Figure 1:
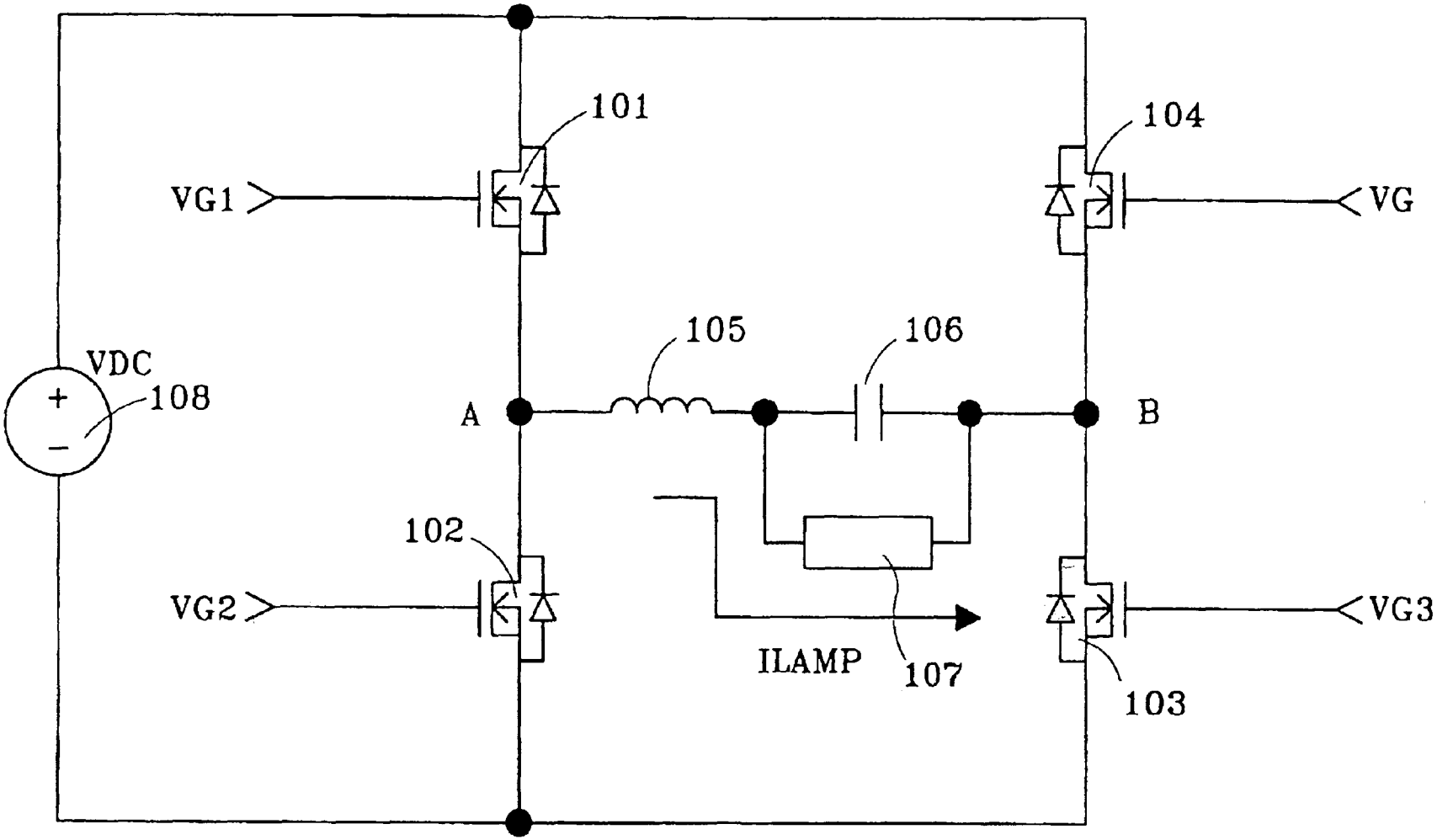
Fig.1 PRIOR ART
FIG. 1 is a schematic view illustrating a traditional fixed frequency operation full bridge phase shift converter circuit.
Figure 2A:
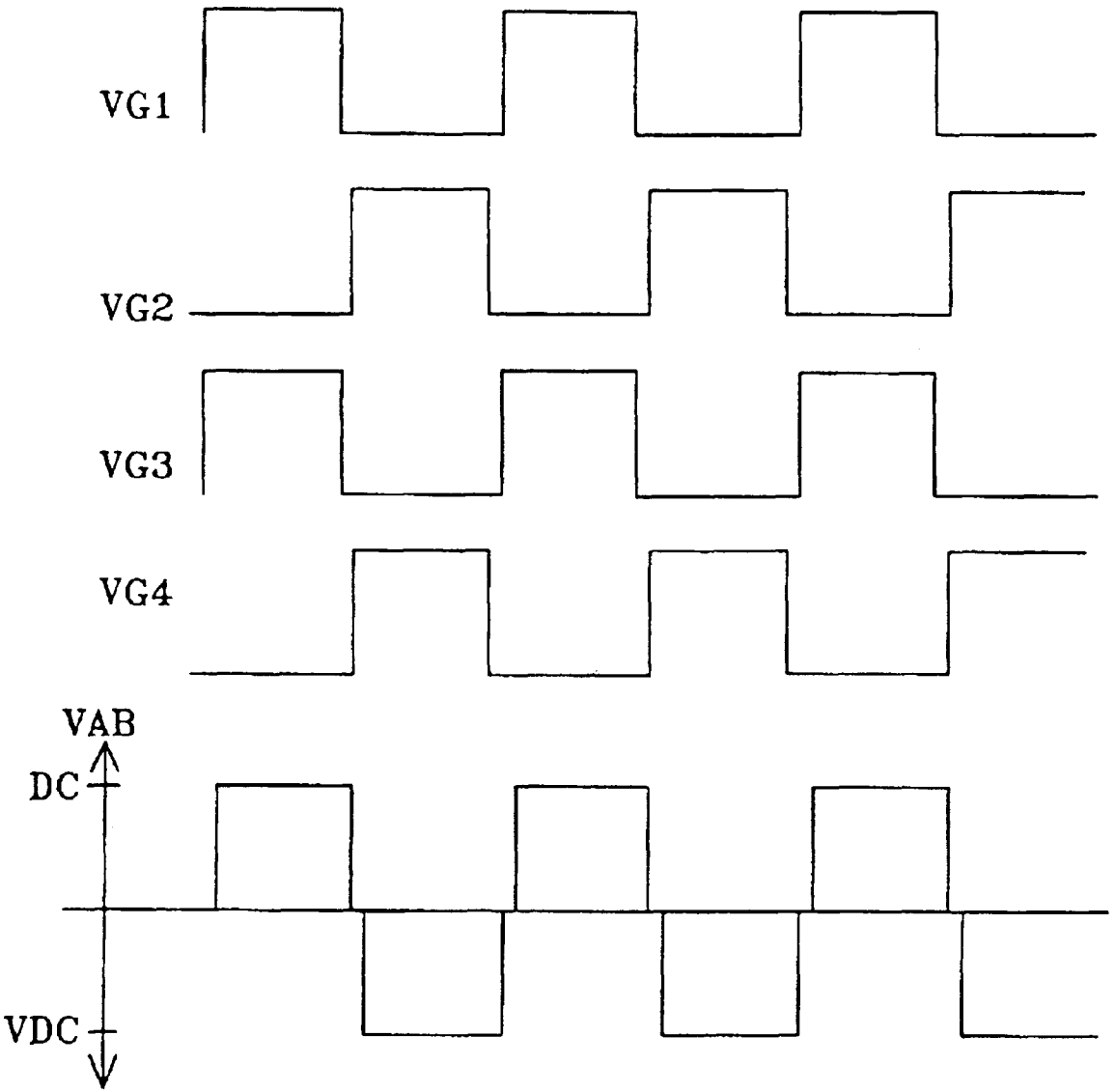
Fig.2A PRIOR ART
FIG. 2A and FIG. 2B are time/sequence charts of the operation of the fixed frequency operation full bridge phase shift converter.
Figure 2B:
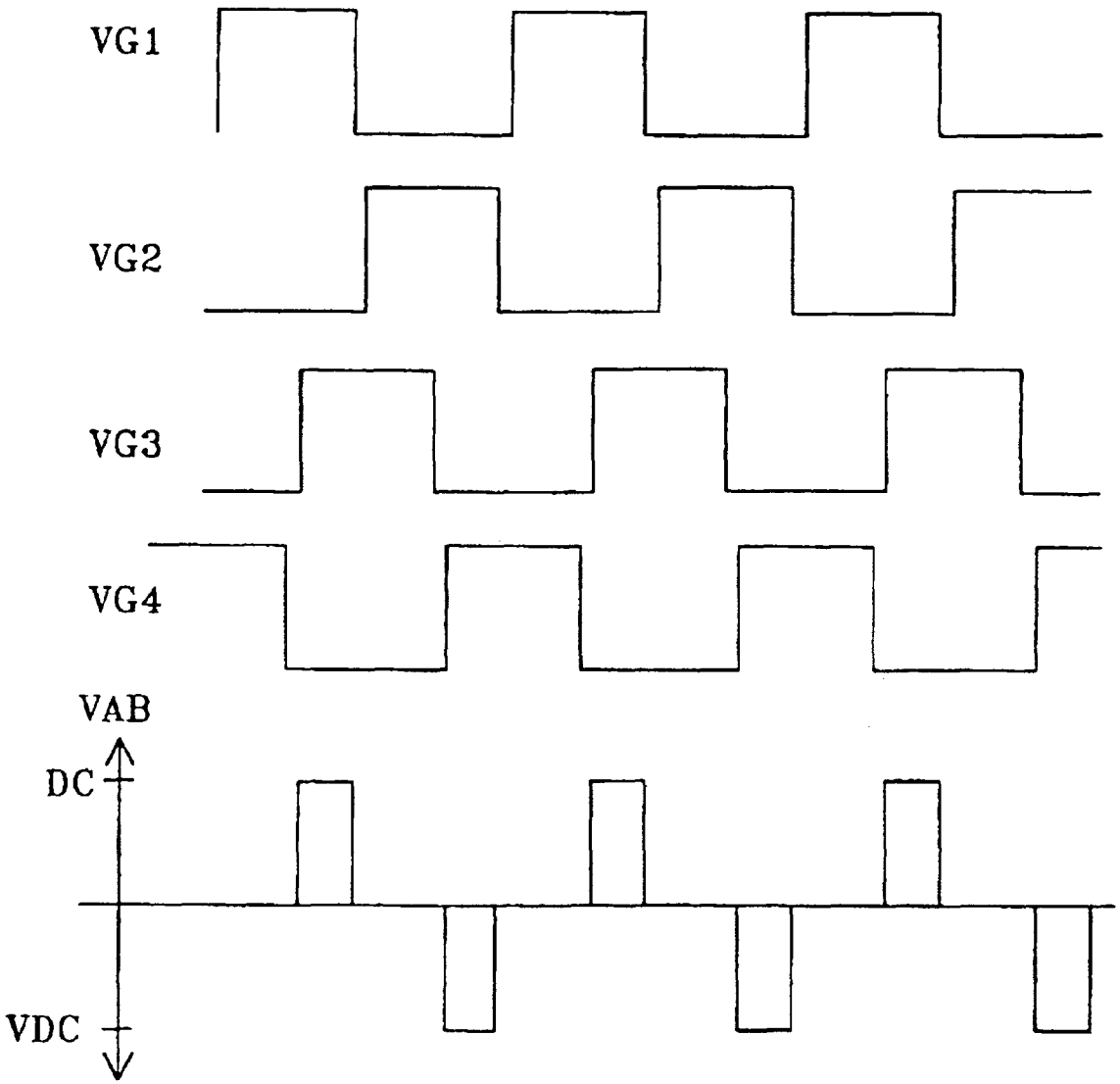
Fig.2B PRIOR ART

Wherever possible in the following description, like reference numerals will refer to like elements and parts unless otherwise illustrated.

Figure 3:
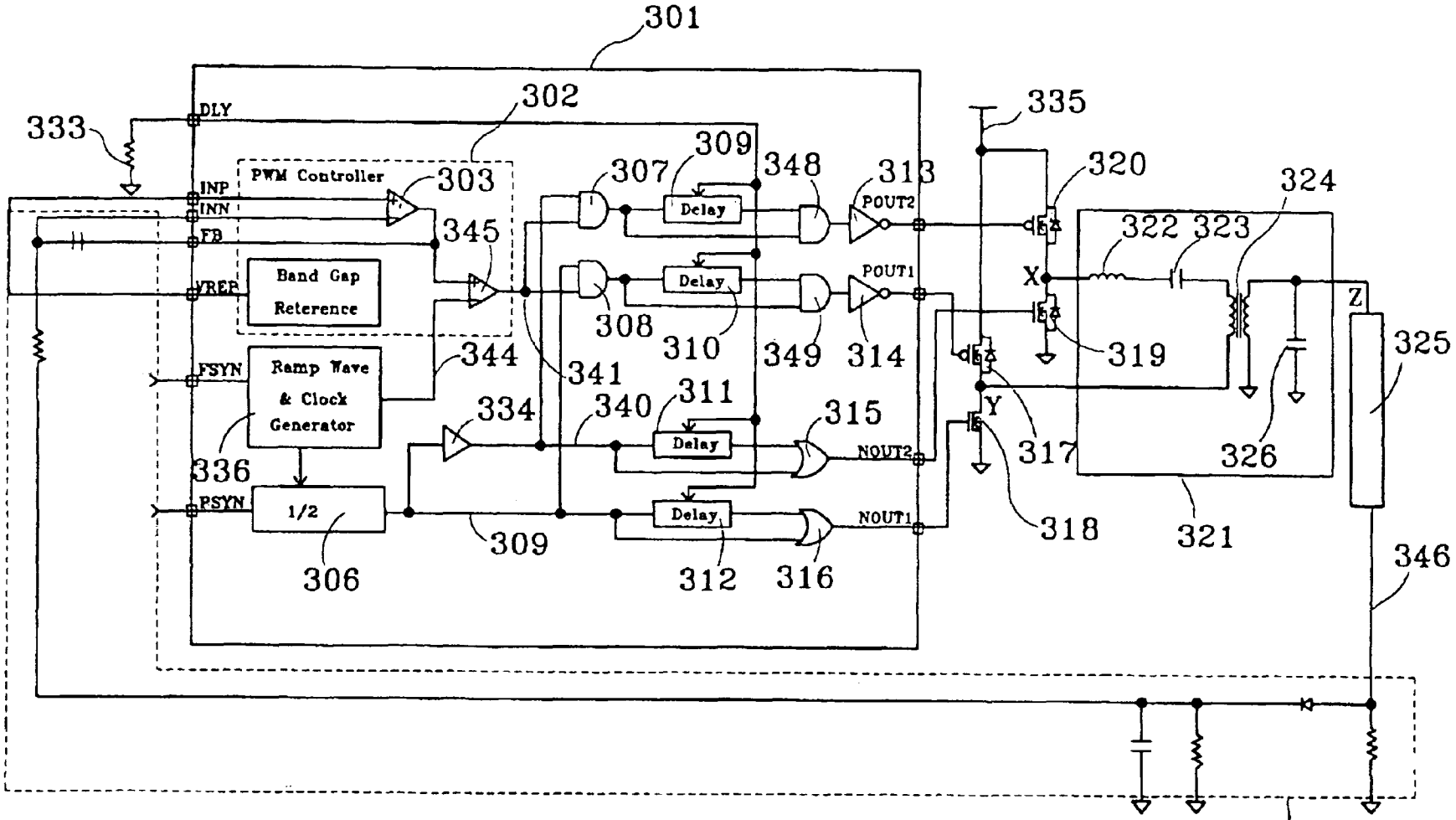
FIG. 3 is a schematic view illustrating a CCFL control integrated circuit according to an embodiment of the invention.
Figure 4:
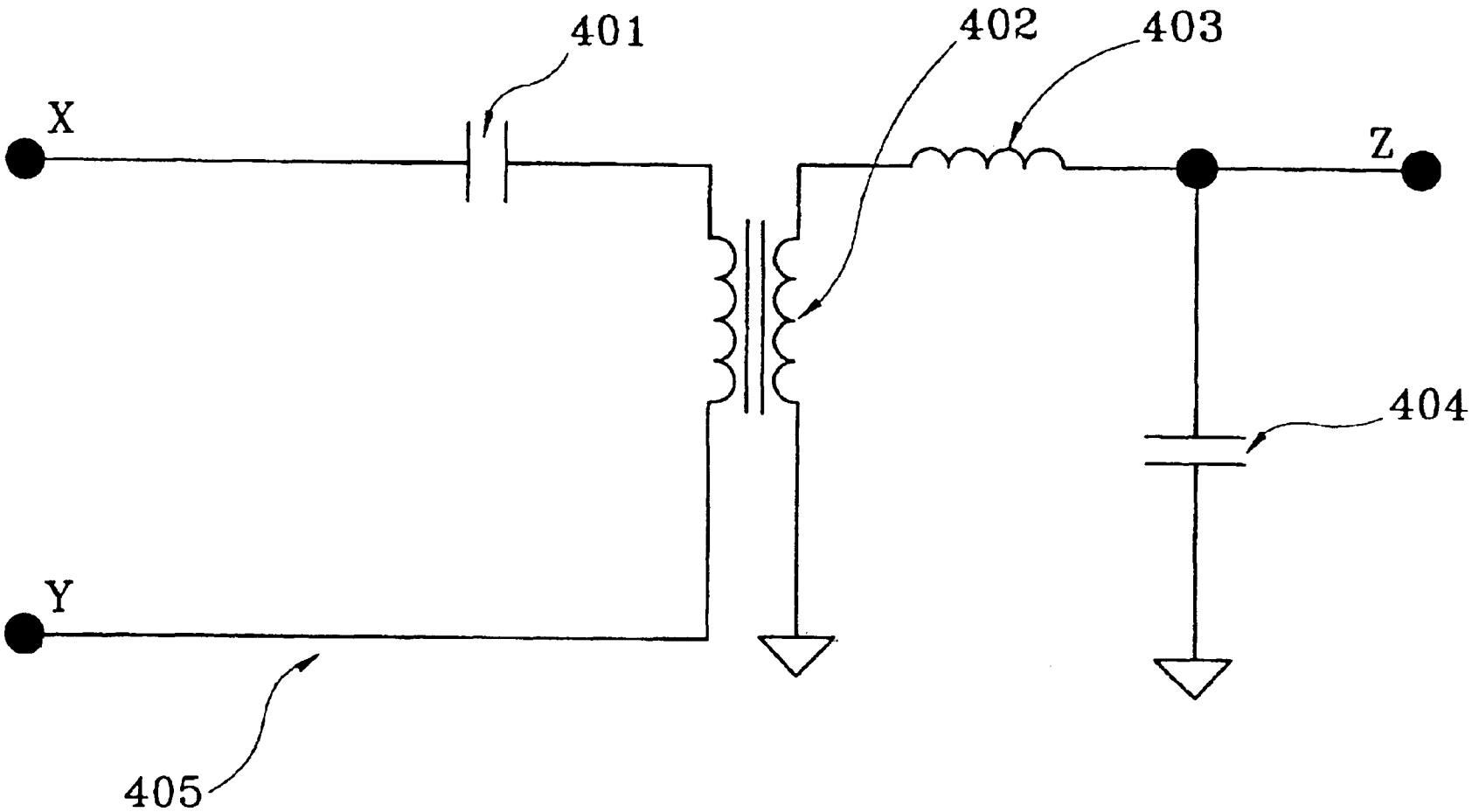
FIG. 4 is a schematic view of a resonance network circuit according to an embodiment of the invention.
Figure 5:
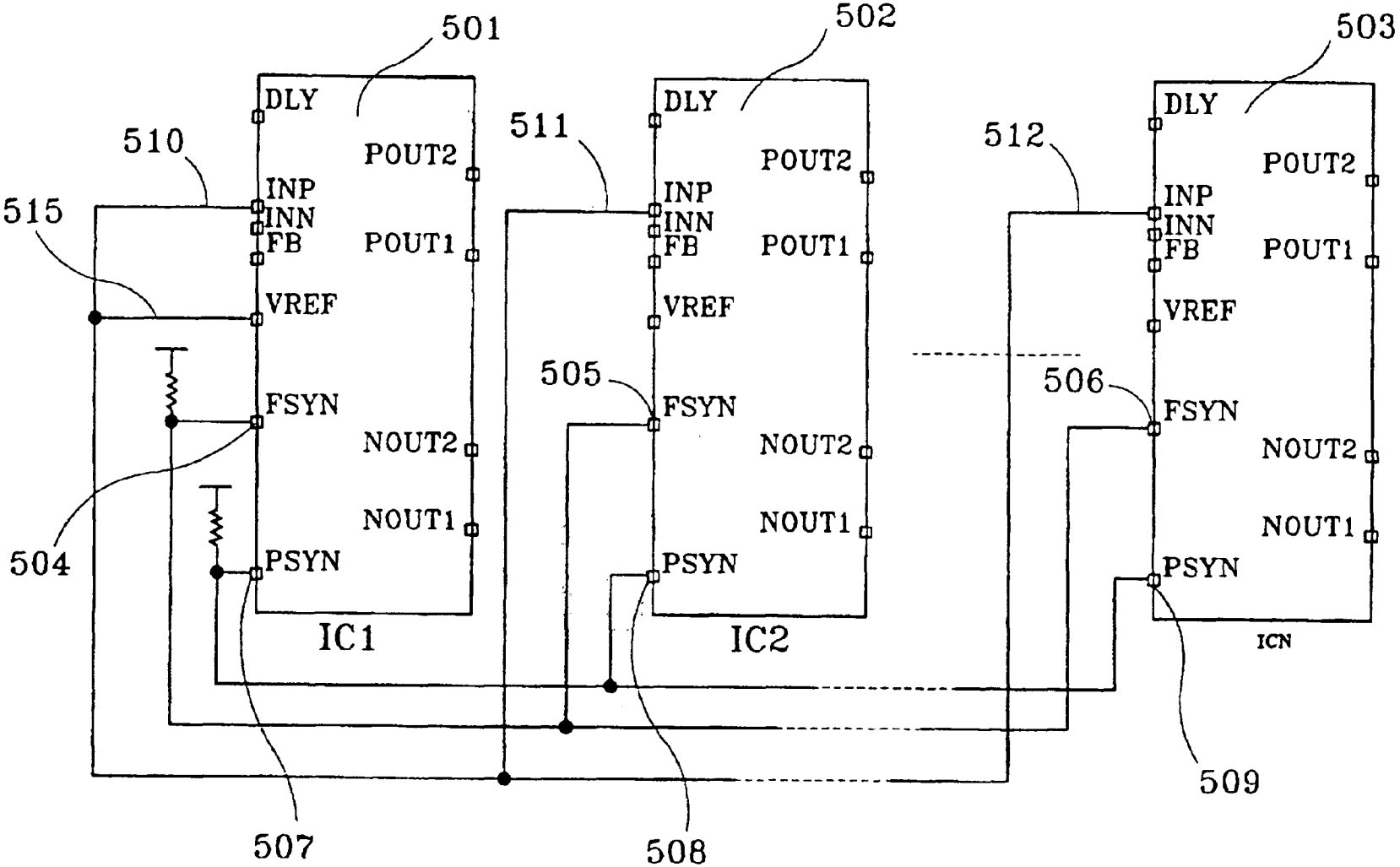
FIG. 5 is a schematic view illustrating a multi-lamp applying circuit according to an embodiment of the invention.

FIG. 3, FIG. 4, and FIG. 5 are schematic views respectively illustrating a cold cathode fluorescent lamp (CCFL) control circuit, a resonance network circuit, and a multi-lamps applying circuit according to an embodiment of the invention. The multi-lamp LCD back-light control circuit of the invention uses a constant operating frequency and PWM (pulse width modulation) feedback to control the CCFL current.

As shown in FIG. 3, the multi-lamp LCD back-light control circuit comprises full bridge switches 317, 318, 319, 320. The resonance network circuit 321, comprised of a step-up transformer 324, inductor 322, and capacitors 323, 326, converts a direct current (DC) from a power source 335 to an alternating current (AC) needed by the CCFL circuit 325. The inductor 322 and capacitors 323, 326 of the resonance network circuit 321 can be disposed on a primary side of the transformer as shown in FIG. 3, or on secondary sides 403, 404 of the transformer as shown in the resonance network circuit 405 of FIG. 4. The inductors 322, 403 of the resonance network circuits 321, 405 as described above may be either independent elements separate from the transformer, or leakage inductors generated by the transformer. Similarly, the secondary side capacitor of the resonance network circuits 321, 405 can be either independent electric clement or parasitic capacitor generated between the CCFL and the LCD.

Among the full bridge switches, the switches 317, 320 connected to the power source 335 (also called "power switches") are PMOSFET switches, while the switches 318, 319 connected to the ground (also called "ground switches") are NMOSFET switches. Within the full bridge switches, the change and output of the duty cycle of the switches 317, 320 are controlled via a PWM controller 302. In turn, the duty cycle of the switches 318, 319 is constant and further must be controllable above 50%. Furthermore, the phase relationship between the control signal of the NMOSFET ground switches 318, 319 and the control signal of the PMOSFET power switches 317, 320 is invariant. More particularly with respect to the above NMOSFET and PMOSFET having a common drain connection, when said NMOSFET is turned on, said PMOSFET is oppositely turned off. With respect to the NMOSFET and PMOSFET without common drain connection, said PMOSFET is turned on only after a preset delay after the turn on of the NMOSFET.

A triangular wave generator 336 is further connected to an input of the PWM controller 302. The operating frequency of the triangular wave generator 336 can be controlled through an external synchronous signal delivered through a control terminal FSYN. A ½ divider circuit 306 is further used to generate a time sequence as driving input of the ground switches 318, 319. The phase of the ½ divider circuit 306 can be synchronized via an external synchronous signal delivered through the control terminal PSYN.

Referring to FIG. 5, the multi-lamps applying circuit is formed via coupling between one another a plurality of integrated circuits (IC) 501, 502, 503, each of which is respectively formed by assembly of the control unit 301 as shown in FIG. 3. The ICs 501, 502, 503 usually have their respective frequency synchronous signal control terminal 504, 505, 506 connected together so that all the ICs are operated with a same frequency. Similarly, respective phase synchronous signal control terminals 507, 508, 509 of the ICs may be connected together to operate all the ICs with a same phase.

Figure 6:
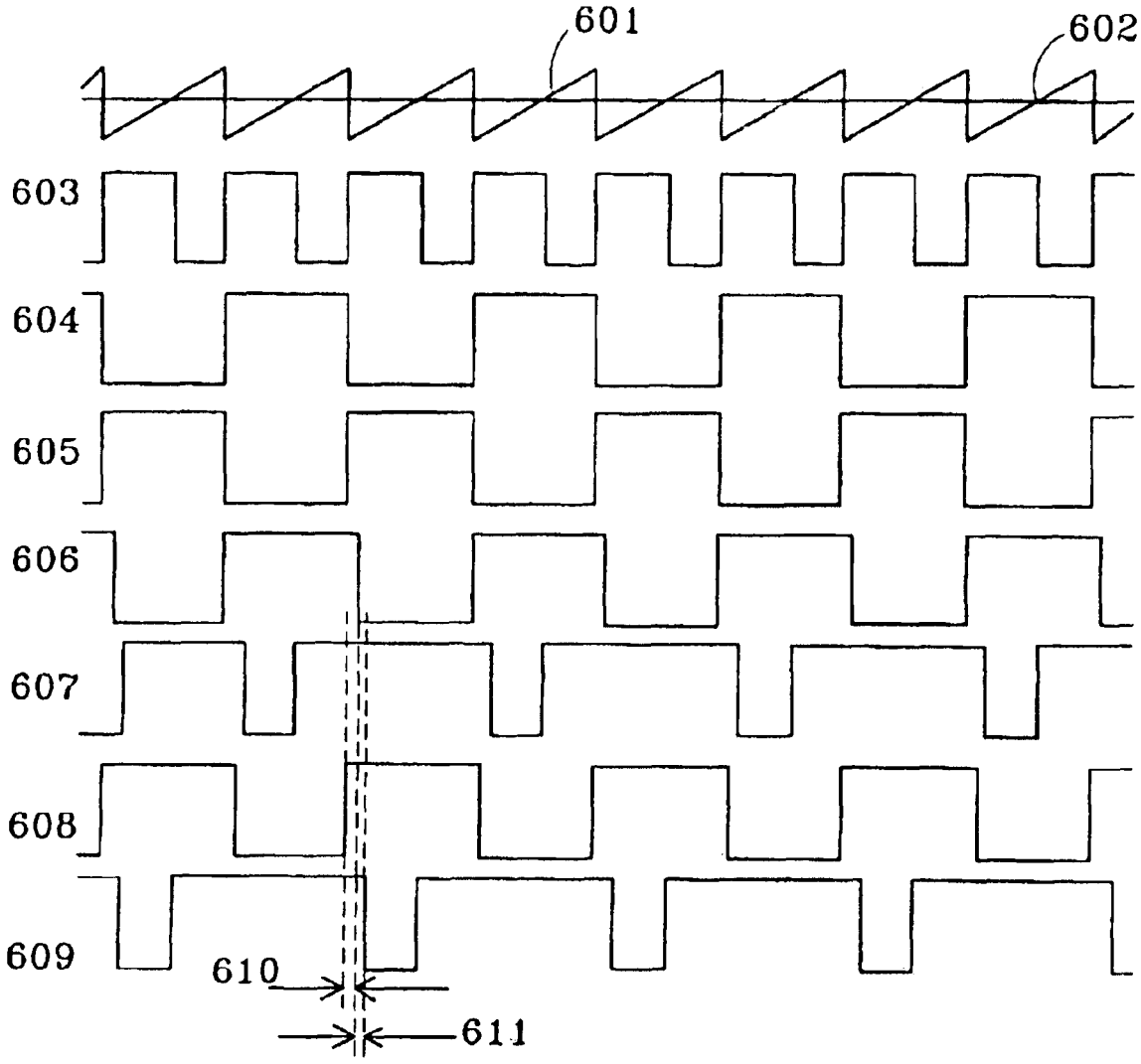
FIG. 6 is a schematic view illustrating the relationship between the control signals of the control circuits according to an embodiment of the invention.

With reference to FIG. 3 in conjunction with FIG. 6, now is described the relationship of the control signals between the CCFL control circuit and each control circuit. As illustrated, the CCFL control circuit of the invention is therefore provided with traditional full bridge switch structures and traditional elements of a PWM controller to control the switch of the CCFL and the lamp currents in a feedback control manner. In addition, NMOSFET and PMOSFET are used as switch elements to achieve a more effective switching operation, which favorably increases the efficiency of the whole circuit. Furthermore, the CCFL control circuit of the invention includes different ICs that are connected to one another in such a manner that their respective operating frequency and phase can be synchronously controlled, thereby the perturbations due to frequency and phase differences are prevented during the operation of the lamps.

Within the CCFL control circuit as shown in FIG. 3, the control unit 301 comprises a PWM controller 302, a triangular wave/clock generator 336, a ½ frequency divider 306, and a logic circuit. The PWM feedback control circuit typically measures the AC output 346 of the lamp 325. After AC from the lamp 325 is commutated and filtered through the feedback network 347, the resulting DC is delivered to the inverter input INN of the error amplifier 303 within the PWM controller 302 to be compared with a reference voltage VREF inputted to the not-inverter input INP.

The triangular generator 336 generates a triangular wave output 344 which configuration is shown in FIG. 6 as reference numeral 601. The voltage level (reference numeral 602 in FIG. 6) of the output 345 of the error amplifier 303 is compared with the triangular wave output 344 by means of a comparator 304 to obtain a PWM output wave (reference numeral 603 in FIG. 6) at the output terminal 341. According to the current intensity of the lamp 325, the PWM feedback control circuit can typically modify the voltage level 602 at the output 345 of the error amplifier 303 along which the duty cycle of the output wave 603 from the comparator 304 is also changed. The output of the lamp 325 is thereby automatically regulated.

The full bridge circuit of the invention hence is driven via driving signals, formed from a set of constant duty cycles greater than 50%, that are further accompanied with the output of the PWM controller generating an appropriate change of the duty cycle. In the invention, the control signals of constant cycles drive the NMOSFET 318, 319 as described below.

By means of the ½ frequency divider 306, the clock triangular signal 601 from the triangular wave generator is transformed to a clock signal 604 (also called "half clock signal") having a frequency equal to half the frequency of the triangular signal 601. The inverter 334 then inverts the half clock signal 604 to an inverted half clock signal 605. Both clock signals 604, 605 are delivered through outputs 339, 340 to delays 312, 311 and OR logic 316, 315 to generate signals 606, 608 of duty cycle greater than 50%, delivered through the outputs NOUT1, NOUT2. The signals 606, 608 have a duty cycle that is delayed a delay time 610 behind the half clock signals 604, 605. If needed, this delay time can be adjusted by means of a time delay controller element 333.

To drive the full bridge switches, the changed duty cycle from the PWM controller is combined with the driving signals of constant cycle in the manner described hereafter. A Boolean AND is applied to the half clock signals 340, 339 and the output 341 of the PWM controller 302 by means of the AND logic 307, 308, so that the PWM output 341 is in outputting configuration only when the half clock signals are in the logic state "1". The time delays of the delays 309, 310 can be controlled via the controller elements 333. AND logic 348, 349 enable the PWM output 341 to be turned on only after a delay time 611 behind the turn on of the NMOSFET. Because the PMOSFET and NMOSFET respectively are driven via low and high voltages, inverters 313, 314 therefore invert the PWM output to infer the PMOSFET. Within the above circuitry, the control signal 607 driving the PMOSFET 320 at the output POUT2 is in turn-on state (logic "0") only if the control signal 606 driving the NMOSFET 318 at the output NOUT1 is in turn-on state (logic "1"). Similarly, the control signal 609 driving the PMOSFET 317 at the output POUT1 is in turn-on state (logic "0") only if the control signal 608 driving the NMOSFET 319 at the output NOUT2 is in turn-on state (logic "1").

As described above, another characteristic of the invention is a synchronous operation of the frequency and phase. As shown in FIG. 3, the oscillating frequency of the triangular wave generator 336 can be synchronized by means of externally added signals. Processing of the phase synchronous signals is included in the frequency divider circuit 306. As shown in FIG. 5, while operating a plurality of lamps, all the non-inverter input terminals 510, 511, 512 of the error amplifier are connected to a same reference voltage 515 so that the current of the lamps are balanced. Meanwhile, by coupling all the frequency inputs 504, 505, 506 of the controller ICs to one another in a synchronizing configuration, the lamps can be operated with a same frequency. Similarly, by coupling all the phase inputs 504, 505, 506 to one another in a synchronizing configuration, the lamps can be operated with a same phase. The requisite condition of operation with a same phase is that the circuitry must be operated with a same frequency. To obtain a highly effective operation of the circuitry, the operating frequency of the controller ICs can be chosen higher than the resonance frequency of the resonance network.

Figure 7A:
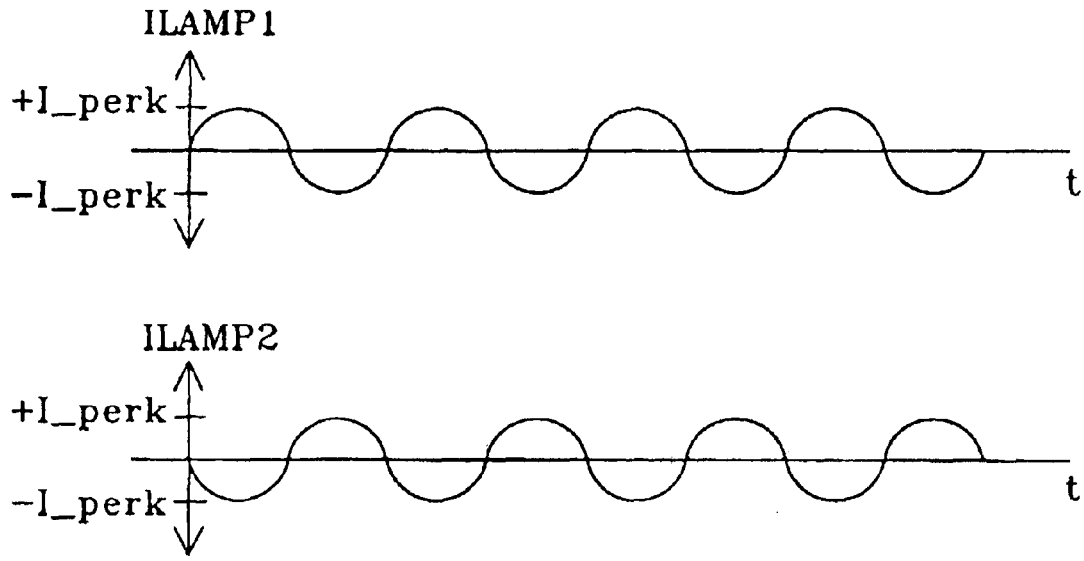
FIG. 7A and FIG. 7B are two schematic view illustrating two lamp current phase configurations under similar frequency operation of multi-lamps according to an embodiment of the invention.
Figure 7B:
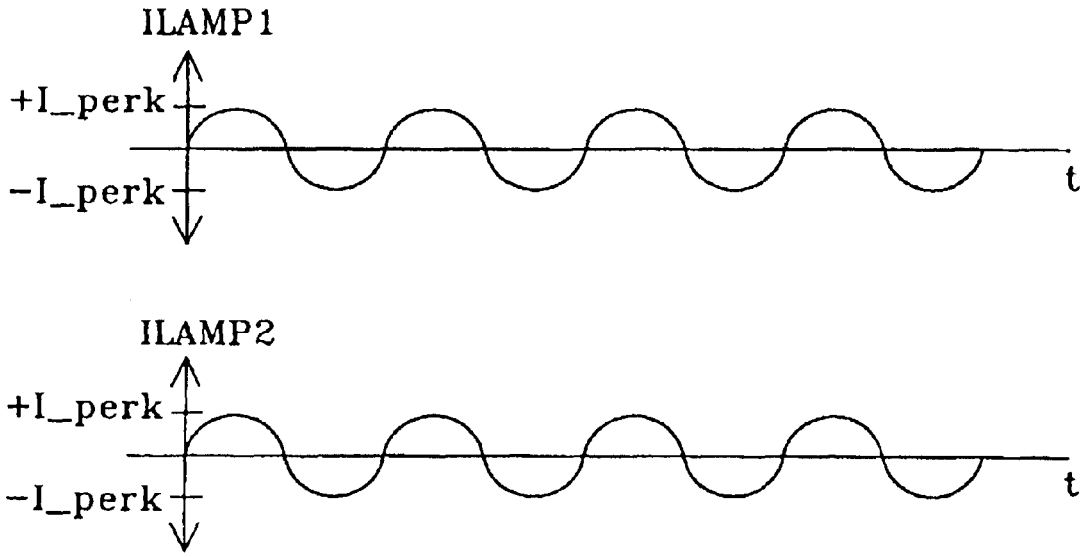

FIG. 7A and FIG. 7B schematically illustrate two possible phase variations of the lamp current in an operation of multiple lamps with a same frequency. More particularly, FIG. 7A illustrates a lamp current phase in inversion configuration within an operation of multiple lamps with a same frequency. FIG. 7B illustrates a lamp current phase in similar configuration within an operation of multiple lamps with a same frequency. When the phases are inverted, the flow of AC currents through the strayed capacitors between the lamps may generate current leakage. Via synchronous regulation, the invention favorably eliminates the occurrence of current leakage and increases the performance of the entire circuit.

Figure 8A:
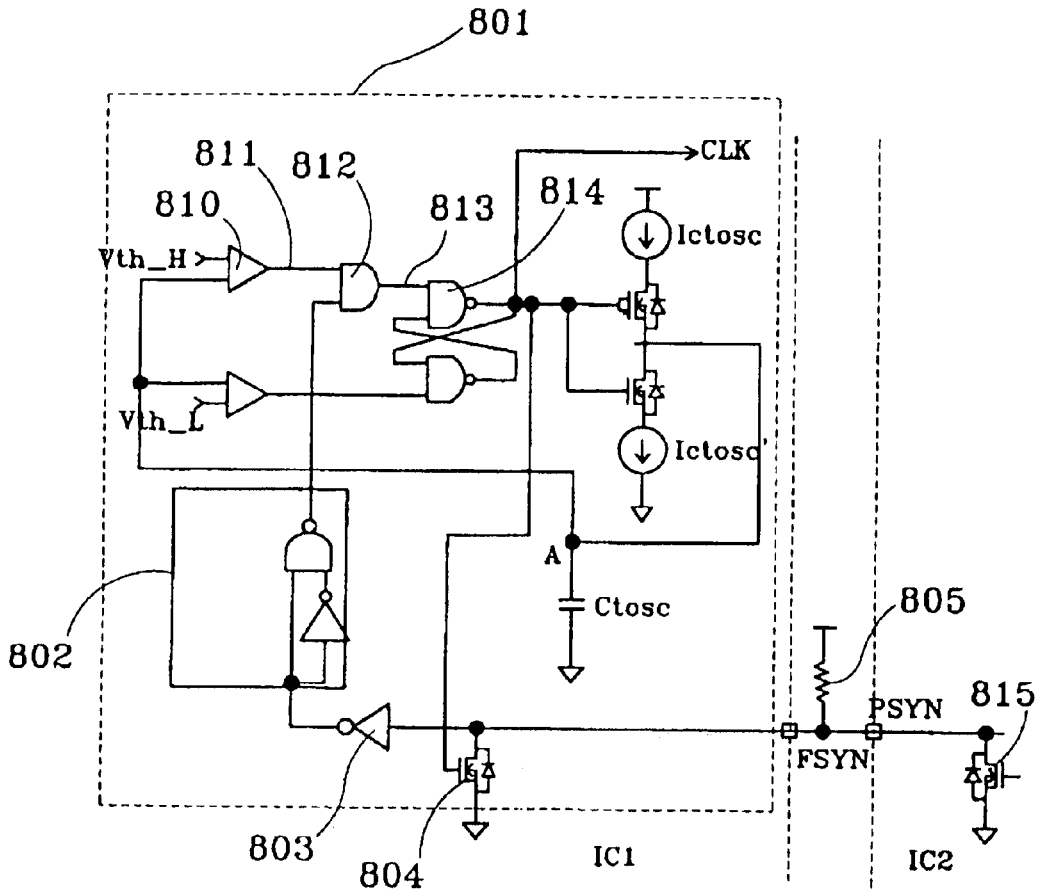
FIG. 8A is a schematic view illustrating a triangular wave generator circuit according to an embodiment of the invention.
Figure 8B:
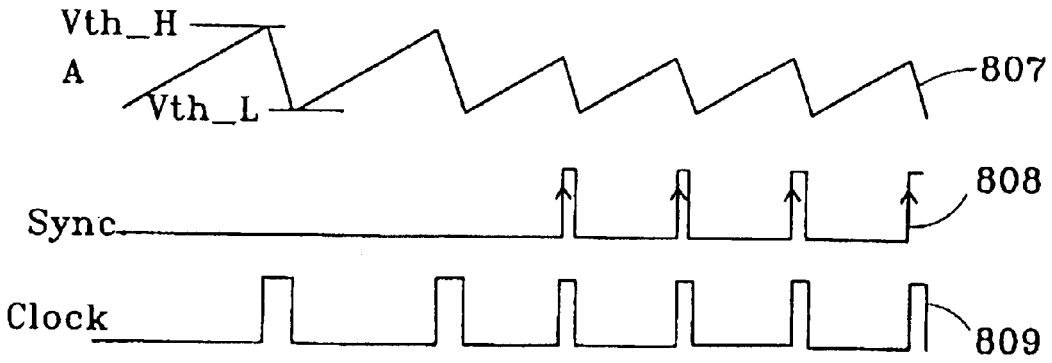
FIG. 8B is a wave time/sequence chart corresponding to the circuit of FIG. 8A.

FIG. 8A is a schematic view of the triangular wave generator circuit, and FIG. 8B is a corresponding time/sequence chart. As shown in FIG. 8A, the triangular generator circuit 801 includes a raising edge detector circuit 802. It should be noted that the traditional triangular wave generator without synchronous function has the output 811 of the comparator 810 short-circuited with the input 813 of the NAND gate 814. However, in the embodiment of the invention, a NMOSFET 804 with open drain is added to synchronize the triangular generator with the external signal FSYN. If the connection scheme of the NMOSFET 804 and the external pull-up capacitor 805 is as shown in FIG. 5, a wired NOR logic then is formed from NMOSFET 804, 815 of different ICs, the inverter 803 then can change this NOR logic into an OR logic.

The raising edge detector circuit 802 further includes an AND gate 812 which inputs are connected to the output 505 of the comparator 810 and the output 815 of the raising edge detector circuit 802. The output 813 of the AND gate 812 is inputted to the NAND gate 814 to control the operation of the triangular generator. FIG. 8B is a time/sequence of the entire circuit according to an embodiment of the invention. In FIG. 8B, reference numeral 807 is the external synchronous control triangular signal taken at the point A of FIG. 8A. Reference numeral 808 is the external synchronous control signal. Reference numeral 809 is the external synchronous control signal received by the triangular wave generator clock.

Figure 9:
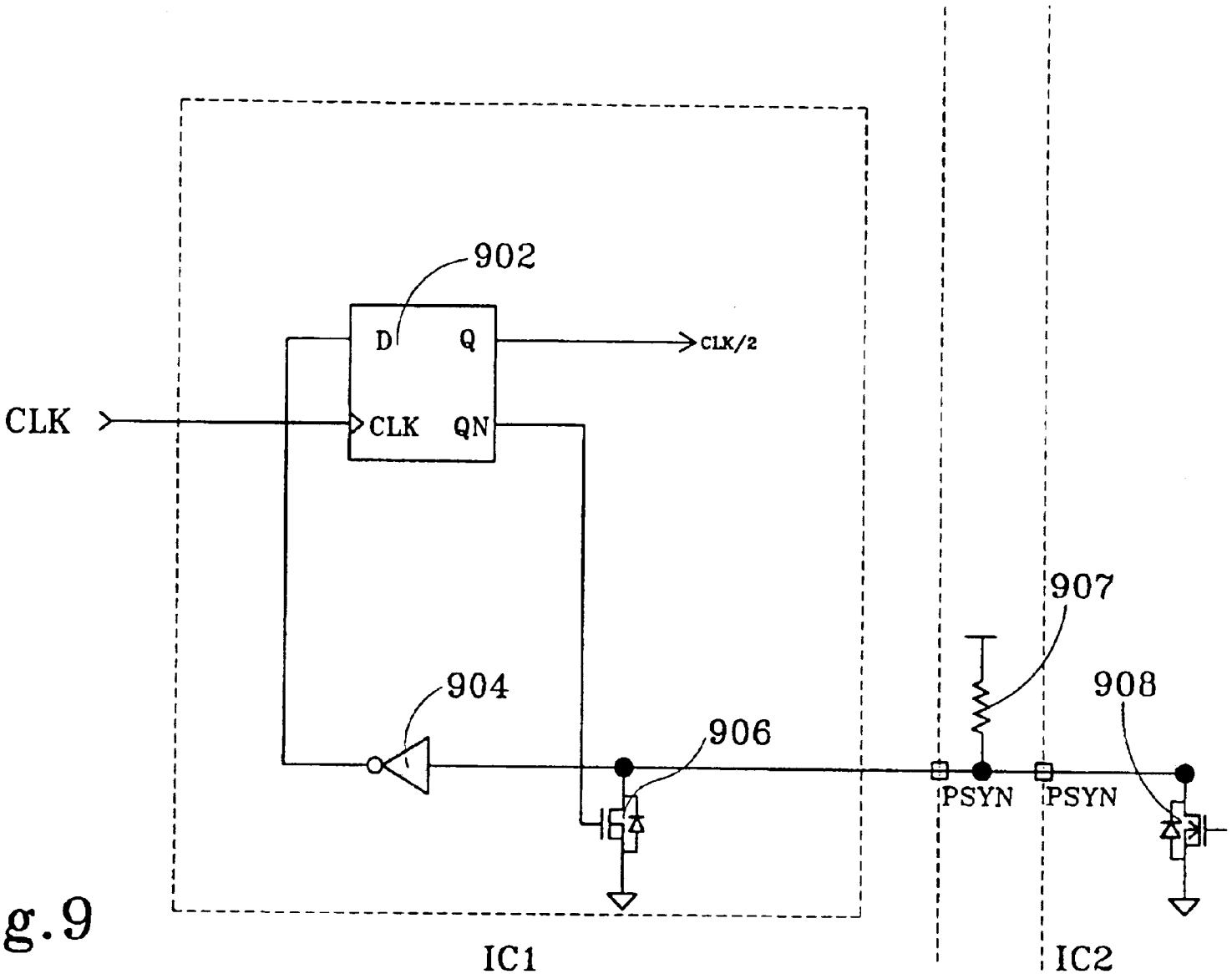
FIG. 9 is a schematic view of a phase synchronization ½ frequency divider circuit according another embodiment of the invention.

FIG. 9 schematically illustrates a phase synchronous ½ frequency divider circuit according to an embodiment of the invention. As illustrated, to achieve a phase synchronous ½ frequency divider circuit, a common ½ divider circuit 902 is further provided with a D-type inverser 902 that has an output QN directly connected to the input D. Hence, if the phase synchronous terminal PSYN of different IC are connected to one another and further to the Pull up capacitor 907, as traditionally achieved and illustrated in FIG. 5, a wired NOR is formed from NMOSFET 906, 908 of different ICs with a Pull up capacitor 907. The inverter 904 thus inverts the result of the NOR to an OR. When the entire circuit is operated with a same operating frequency, the phase of the output CLK/2 is therefore decided by the first IC switching to a logic state "1" (high level.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A multi-lamps liquid crystal display (*LCD*) panel back-light control circuit, comprising a control unit, an full bridge switch, a resonance network circuit, a voltage transformer, a lamp, and a feedback network, wherein a constant operating frequency and a pulse width modulation (PWM) feedback are used to control a current of cold cathode fluorescent lamps [(CCFL)] (*CCFLs*), the back-light control circuit being characterized in that a power switch of the full bridge switch outputs a duty cycle that is controlled and changed via a PWM controller of the control unit, while a ground switch of the full bridge switch outputs a constant duty cycle controllable above 50%;

wherein a phase relationship between a signal that controls the ground switch and a signal that controls the power switch is constant, the ground switch being formed from at least [a] *an* NMOSFET and the power switch being formed at least from a PMOSFET; wherein with a common drain connection of the ground switch and the power switch, the power switch is turned off when the ground switch is turned on, and without a common drain connection, the power switch is turned on only after a preset delay from a turn on of the ground switch.

2. The circuit of claim 1, wherein the power switch of the full bridge is formed from two [PMOSFET] *PMOSFETs* and the ground switch is formed from two [NMOSFET] *NMOSFETs*.

3. The circuit of claim 1, wherein the control unit further comprises a PWM controller, a triangular wave/clock generator, a ½ frequency divider, and a logic circuit.

4. The circuit of claim 3, wherein the PWM controller includes an error amplifier which has an output with a voltage level that is compared to an outputted triangular wave via a comparator before obtaining a PWM output wave.

5. The circuit of claim 3, wherein the ½ frequency divider transforms the clock of the triangular wave/clock generator to a half frequency clock signal with a frequency equal to a half of the triangular wave, [the] *an* inverter inverting the half frequency clock signal to an inverted half frequency clock signal; the half clock signal and the inverted half clock signal being outputted through a delay and an OR logic to generate an output signal having a duty cycle greater than 50% and delayed from the half clock signal, wherein the delay time is adjustable by means of a delay time controller element.

6. The circuit of claim 3, wherein a changed duty cycle output generated from the PWM controller is calculated as the result of an AND logic from the half clock signal and the output of the PWM controller, thereby the output of the PWM controller is in an outputting state only when the half clock signal is in a "1" logic state, the delay being adjustable by means of controller elements, and the AND logic enables the output of the PWM controller to be turned on only after a delay from the a turn on of the NMOSFET; wherein the PMOSFET being of low driving voltage and the NMOSFET being of high driving voltage, the inverter and the logic transform the PWM output to push the PMOSFET.

7. The circuit of claim 3, wherein the operating frequency and the synchronization of the operating phase of the triangular wave generator and the [½ divider circuit] *½ frequency divider* are controlled via a plurality of external synchronous signals delivered through control terminals thereof.

8. The circuit of claim 1 or 3, wherein different integrated circuits are respectively formed from the control unit, the different integrated circuits (IC) including either a plurality of respective frequency synchronous signal control terminals or a plurality of phase synchronous signal control terminals that are connected to one another so that the different ICs operate respectively either with a same operating frequency or a same phase.

9. The circuit of claim 1, wherein the resonance network *circuit* includes an inductor and a capacitor that are placed in the voltage transformer either in *a* primary side or *a* secondary side.

10. The circuit of claim 1 or 9, wherein the inductor of the resonance network *circuit* is either a separate and independent element from the *voltage* transformer or a leakage inductor generated by the *voltage* transformer.

11. The circuit of claim 1 or 9, wherein [the] *a* secondary capacitor of the resonance network *circuit* is either an independent element or a parasitic capacitor generated between the [CCFL] *CCFLs* and the LCD display panel.

*12. A back-light control circuit for a liquid crystal display (LCD) panel, comprising:*

*a lamp;*

*a resonance network circuit;*

*a feedback network commutating and filtering an AC output from the lamp;*

*a full bridge switch comprising a plurality of first switches connected to a voltage line and a plurality of second switches connected to a ground, the first and the second switches forming three conduction paths; and*

*a control unit which controls the first switches to output a larger than 50% duty cycle and controls the second switches to output a less than 50% duty cycle in order to enable a current flows through one switch of each of the first and the second switches alternately, wherein a constant operating frequency and a pulse width modulation feedback are used to control a current of the lamp, and the control unit comprises:*

*a PWM (pulse width modulation) controller that controls and changes the duty cycles; and*

*a triangular wave/clock generator, a logic circuit, and a ½ frequency divider which transforms a clock of the triangular wave/clock generator to a half frequency clock signal with a frequency equal to a half of the triangular wave, an inverter inverting the half frequency clock signal to an inverted half frequency clock signal, the half clock signal and the inverted half clock signal being outputted through a delay and an OR logic to generate an output signal having a duty cycle greater than 50% and delayed from the half clock signal, wherein the delay time is adjustable by means of a delay time controller element, and with a common drain connection of the second switches and the first switches, the first switches are turned off when the second switches are turned on, and without a common drain connection, the first switches are turned on only after a preset delay from a turn on of the second switches.*

*13. The circuit of claim 12, wherein the first switches are PMOSFET switches and the second switches are NMOSFET switches.*

*14. The circuit of claim 12, wherein a phase relationship between a signal that controls the second switches and a signal that controls the first switches is constant.*

*15. The circuit of claim 12, wherein the PWM controller further includes an error amplifier which has an output with a voltage level that is compared to an outputted triangular wave via a comparator before obtaining a PWM output wave.*

*16. The circuit of claim 12, wherein a constant operating frequency and a pulse width modulation feedback are used to control a current of cold cathode fluorescent lamps, wherein the operating frequency and a synchronization of an operating phase of the triangular wave/clock generator and the ½ frequency divider are controlled via an external synchronous signal delivered through a terminal thereof.*

*17. A back-light control circuit for a liquid crystal display (LCD) panel, comprising:*

*a lamp;*

*a resonance network circuit;*

*a feedback network commutating and filtering an AC output from the lamp;*

*a full bridge switch comprising a plurality of first switches connected to a voltage line and a plurality of second switches connected to a ground, the first and the second switches forming three conduction paths; and*

*a control unit which controls the first switches to output a larger than 50% duty cycle and controls the second switches to output a less than 50% duty cycle in order*

*to enable a current flows through one switch of each of the first and the second switches alternately, wherein a constant operating frequency and a pulse width modulation feedback are used to control a current of the lamp, and different integrated circuits (ICs) are respectively formed from the control unit, each of the different integrated circuits including either a plurality of respective frequency synchronous signal control terminals or a plurality of phase synchronous signal control terminals that are connected to one another so that the different ICs operate respectively either with a same operating frequency or a same phase.*

*18. The circuit of claim 17, wherein the resonance network circuit comprises a voltage transformer, an inductor and a capacitor, wherein the inductor and the capacitor are placed in a primary side or a secondary side of the voltage transformer.*

*19. The circuit of claim 18, wherein the inductor of the resonance network circuit is an inductor selected from a group consisting of a separate and independent element from the transformer and a leakage inductor generated by the voltage transformer.*

*20. The circuit of claim 19, wherein a secondary capacitor of the resonance network circuit is either an independent element or a parasitic capacitor generated between a CCFL and the LCD panel.*

* * * * *